US005493098A

United States Patent [19]
Diederich

[11] Patent Number: 5,493,098
[45] Date of Patent: Feb. 20, 1996

[54] ELECTRIC CIGAR LIGHTER HAVING COMBINED ASSEMBLER AND CONNECTOR PLUG AT ITS REAR

[75] Inventor: Peter Diederich, Southbury, Conn.

[73] Assignee: Casco Products Corporation, Bridgeport, Conn.

[21] Appl. No.: 289,121

[22] Filed: Aug. 11, 1994

[51] Int. Cl.$^6$ ........................................ F23Q 7/00
[52] U.S. Cl. ............................................... 219/265
[58] Field of Search ........................... 219/260–270; 362/80, 92, 109, 32; 439/650, 682, 685–686, 34, 36, 668

[56] References Cited

U.S. PATENT DOCUMENTS

| | | | |
|---|---|---|---|
| Re. 26,316 | 12/1967 | Horwitt | 219/265 |
| 2,224,034 | 12/1940 | Lehmann . | |
| 2,248,402 | 7/1941 | Conboy . | |
| 2,256,876 | 9/1941 | Wolfson . | |
| 2,258,989 | 10/1941 | Liner . | |
| 2,262,484 | 11/1941 | Bahr . | |
| 2,883,510 | 4/1959 | Krautwurst et al. | 219/265 |
| 3,012,120 | 12/1961 | Gaudet | 200/116 |
| 3,238,353 | 3/1966 | Lybrook | 219/265 |
| 3,424,414 | 1/1969 | Horwitt | 248/27 |
| 3,462,721 | 8/1969 | Boudreau . | |
| 3,532,849 | 10/1970 | Horwitt | 219/265 |
| 3,818,179 | 6/1974 | Mase | 219/267 |
| 3,863,047 | 1/1975 | Mase | 219/265 |
| 3,870,857 | 3/1975 | Horwitt et al. | 219/265 |
| 3,892,944 | 7/1975 | Horwitt et al. | 219/270 |
| 3,904,848 | 9/1975 | Horwitt et al. | 219/267 |
| 4,011,000 | 3/1977 | Wharton | 439/668 |
| 4,498,726 | 2/1985 | Mattis . | |
| 4,580,856 | 4/1986 | Westover . | |
| 4,650,962 | 3/1987 | Pramaggiore | 219/264 |
| 4,669,185 | 6/1987 | Westover et al. | 29/882 |
| 4,713,017 | 12/1987 | Pesapane | 439/142 |
| 4,713,733 | 12/1987 | Fitz et al. | 362/80 |
| 5,030,811 | 7/1991 | Gaisberg et al. | 219/268 |
| 5,044,993 | 9/1991 | El-Haj et al. | 439/668 |
| 5,116,233 | 5/1992 | Croce | 439/161 |

FOREIGN PATENT DOCUMENTS

| | | |
|---|---|---|
| -434518 | 6/1991 | European Pat. Off. . |
| 929562 | 6/1955 | Germany . |

Primary Examiner—John A. Jeffery
Attorney, Agent, or Firm—Mitchell D. Bittman; H. Gibner Lehmann

[57] ABSTRACT

A motor vehicle electric cigar lighter in the form of a metal receptacle shell is adapted to receive a lighter plug, and a combined assembler and connector plug is attached to the rear of the shell. A bimetallic clip in the shell engages and energizes a usual lighter plug inserted therein. A fastener stud carries the bimetallic clip, and has a shank projecting from the rear of the shell. The combined assembler and connector plug includes a hollow molded plastic plug body having a recess adapted to receive a female electrical connector receptacle on the vehicle's wiring harness. The assembler and connector plug further comprises a contact prong member disposed in the recess of the plug body and adapted to mate with the female electrical connector receptacle. The prong member has a base portion which is molded or embedded in the plug body, and the base portion has an opening that receives the shank of the fastener stud, by a force fit. The arrangement is such that the plastic plug body is secured to the receptacle shell by the fastener stud, which latter also effects electrical connection between the bimetallic clip and the prong member.

40 Claims, 5 Drawing Sheets

ELECTRIC CIGAR LIGHTER HAVING COMBINED ASSEMBLER AND CONNECTOR PLUG AT ITS REAR

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

CROSS REFERENCES TO RELATED APPLICATIONS

1. Copending U.S. application Ser. No. 08/201,700 filed Feb. 25, 1994, entitled CONNECTOR RECEPTACLE CONSTRUCTION FOR ELECTRIC CIGAR LIGHTERS, in the names of Donald J. Mattis and Ali El-Haj, and having common ownership with the present application. The entire disclosure of application U.S. Ser. No. 08/201,700 is specifically incorporated into the present application by reference.

BACKGROUND OF THE INVENTION

1. Field of the Invention

This invention relates generally to electric cigar lighters of the type commonly employed in automotive or recreation vehicles, and more particularly to specialized electrical connector constructions for energizing such lighters.

2. Description of the Related Art Including Information Disclosed Under 37 CFR 1.97–1.99

The present invention relates more particularly to improvements in the cigar lighter receptacle construction illustrated and described in assignee's expired U.S. Pat. No. 3,532,849 dated Oct. 6, 1970, issued to L. Horwitt, and entitled BIMETAL SHUNT FOR ELECTRIC CIGAR LIGHTER. Reference is specifically made to the embodiment of FIG. 4, and that of FIG. 5 of this patent.

The copending application referred to above, in the names of Donald J. Mattis and Ali El-Haj, discloses one approach constituting an improvement over the prior patented construction.

The following patents are hereby made of record and are believed to constitute a sampling of existing prior art in the particular field to which the present invention relates:

U.S. Pat. Nos.: 2,224,034, 2,248,402, 2,256,876, 2,258,989, 2,262,484, 3,012,120, 3,424,414, 3,462,721, 3,818,179, 3,863,047, 3,870,857, 3,892,944, 3,904,848, 4,498,726, 4,580,856, 4,650,962, 4,669,185, 4,713,017, 4,713,733, 5,044,993, 5,116,233.

U.S. Pat. No. 3,532,849, FIGS. 4 and 5, discloses cigar lighter constructions incorporating bimetal shunts disposed in adapter shells (22, 22') mounted at the rear of a lighter socket. In such constructions, controlled flexing of the bimetal occurs unless an overheat condition arises in the socket, such as that resulting from a short circuit in either the socket or the removable ignitor unit. In the event of malfunction, the bimetal flexes sufficiently to electrically contact the inner surface of the shell, thereby shorting the hot lead to ground, and purposely blowing an in-line fuse so as to minimize the possibility of a fire.

The concept of the bimetal shunt circuit in a cigar lighter socket has been widely accepted since the advent of this patent, and devices embodying the basic concept thereof have, as a result, enjoyed great commercial success over the years, having been utilized in millions of automotive vehicles and spanning a period of more than two decades.

Particular reference is made to the following three patents:

1. U.S. Pat. No. 3,012,120 discloses an in-line bimetal circuit breaker for installation at the rear of a cigar lighter socket. As shown, only the "hot" electrical circuit is controlled; the ground side of the circuit remains intact after the breaker opens. As opposed to U.S. Pat. No. '849 discussed above, this patented construction did not "shunt" the hot side of the circuit during an overheat condition. Instead, it effectively "interrupted" the circuit, as in the case of a fuse or circuit breaker, and once such an interruption occurred, the device was intended to be removed and discarded, and a substitute unit installed. The device retrofitted to existing cigar lighter base constructions, as stated in col. 3, line 25 of the patent.

2. U.S. Pat. No. 4,498,726 illustrates and describes a connector for a cigar lighter socket of the kind having a bimetal safety shunt similar to that of U.S. Pat. No. '849 identified above. The current carrying leads for both the hot and ground sides of the cigar lighter circuit are embedded in a molded plastic or rubber plug, and the plug is adapted to be pushed onto the central terminal stud of the base, and in addition, to make electrical contact with a screw shell carried by the base. In this construction, the bimetal shunt is a part of the cigar lighter socket per se.

3. U.S. Pat. No. 3,462,721 illustrates and describes a circuit breaker for a cigar lighter, in the form of a capsule-like enclosure disposed at the rear of the lighter socket, and containing a bimetallic circuit-breaker type element. The breaker element is adapted to open the hot side of the circuit in the event of overheating of the socket or plug as a consequence of malfunction. Provision is made for insertion of an elongate rod through the socket from the front, to access the interior of the enclosure and enable the breaker mechanism to be re-set, following actuation.

Referring now to others of the patents listed above, three show another form of cigar lighter which has been in widespread use in this country, for at least 15 years. In particular, U.S. Pat. Nos. 3,870,857; 3,892,944; and 3,904,848 contain generally similar disclosures which describe cigar lighter structures that are especially adapted for manufacture and assembly by means of automated equipment. At the time of issuance of these patents, the disclosed lighters were referred to by the assignee corporation, as "New Generation Lighters", because of the advances that had been made with respect to economy, ease of assembly, low failure rate, and the ability to mass produce them in large quantities.

U.S. Pat. No. 5,116,233 discloses a cigar lighter construction utilizing a modified form of bimetal shunt, somewhat similar to that of U.S. Pat. No. '849 noted above. In this patented design, the bimetal shunt is disposed inside the lighter socket, and is indicated at (17). Overheating of the pull-out igniting unit (not shown), or of the socket itself results in the bimetal contacting the inner surface of the metal socket wall (18), in turn causing an in-line fuse (not shown) to blow and thus minimize potential fire hazard.

The remaining patents mostly deal either with bimetal circuit controllers, or else with various terminal configurations associated with known cigar lighters and which were designed to facilitate making electrical connection thereto.

These are briefly discussed hereinbelow, in chronological order.

U.S. Pat. No. 2,224,034 shows an early lighter design employing a bimetal element that is utilized solely as a releasable, non-current carrying clip which is engaged by a heating element cup when the lighter is actuated. One side of the electrical circuit was established through the metal socket of the lighter, while the hot side (stud 28, FIG. 1) accepted a crimp-type lug connected to an electrical lead of the wiring harness (not shown) of the vehicle's electrical system.

U.S. Pat. No. 2,248,402 illustrates another type of lighter construction in which a bimetal carried in the socket of the device is employed to release a latch that holds the ignitor plug as it is being energized. As in the patent of the previous paragraph, the bimetal itself is electrically out of the circuit, and merely functions to sense that a predetermined heat level has been attained by the heating element of the ignitor plug.

U.S. Pat. No. 2,256,876 illustrates a cigar lighter construction employing two bimetals, one to control latching and release of a spring-biased ignitor plug, and a second bimetal which, in the embodiment of FIG. 1, presses against the first with variable pressure depending upon the ambient temperature prevailing at any particular time. The objective is to minimize undesirable fluctuations in the operation of the first bimetal latch which would otherwise result from changes in its "starting" position due to ambient temperature variations. This patent was cited against U.S. Pat. No. 3,863,047, discussed below.

U.S. Pat. No. 2,258,989 illustrates a temperature sensor plug of especially compact design and which incorporates a bimetal member having multiple reverse bends to the end that changes in temperature cause deflection of the various branches of the bimetal in a manner wherein they are cumulative, in order to obtain maximum deflection and sensitivity over the range of temperatures being monitored. This patent was cited against U.S. Pat. No. 5,116,233 discussed above and which related directly to a bimetal shunt for a cigar lighter.

U.S. Pat. No. 2,262,484 illustrates an automatic cigar lighter having a disk-like bimetallic element which is disposed exteriorly of the socket of the lighter, and which is mechanically flexed by insertion of the ignitor plug, to close external switch contacts. Upon experiencing heat from the heating coil of the ignitor plug, the bimetallic element reverses its curvature and opens the contacts. The bimetallic element itself is separate from the current carrying part of the circuit, and as a result carries no current per se.

U.S. Pat. No. 3,424,414 illustrates a known cigar lighter receptacle of a type which employed the usual bimetallic latching fingers for engagement with a heating element cup of an ignitor plug. This patent was cited against U.S. Pat. No. '849 noted above.

U.S. Pat. No. 3,818,179 discloses a cigar lighter of a type having conventional internal bimetallic fingers which engage a heating element cup of an ignitor plug, and the socket of which has a rearwardly extending, generally cylindrical terminal post (27) for connection to a source of power, not shown. The receptacle configuration adapted to mate with this post is similarly not shown.

U.S. Pat. No. 3,863,047 describes a cigar lighter having incorporated therein a bimetal shunt adapted to respond to overheating within the socket by shifting against a plate connected to the hot terminal, to blow a fuse and minimize potential fire hazard. In one embodiment, the bimetal is carried by the ground side of the cigar lighter circuit, and is arranged to bridge the hot side of the circuit upon experiencing overheating. In a second embodiment, the bimetal is carried by the hot terminal, and is arranged to contact the inner surface of the cigar lighter socket upon experiencing overheating therein.

U.S. Pat. No. 4,580,856 discloses a composite clamp shell for a cigar lighter, constituted of two pieces and including an integral spade lug type terminal for connection to the ground side of an electric circuit, as by means of a grounding push-on type receptacle. U.S. Pat. No. 4,669,185 contains a similar disclosure, having been a Divisional Application based on the Application which matured into U.S. Pat. No. 4,580,856.

U.S. Pat. No. 4,713,017 illustrates and describes an electrical power outlet having a configuration somewhat similar to that of an electric cigar lighter socket. The rear of the socket contains two flat electrical terminals for connection to an electrical circuit.

U.S. Pat. No. 4,713,733 discloses a cigar lighter having a socket with two rearwardly-extending spade lugs for connection to an electrical receptacle (not shown).

U.S. Pat. No. 5,044,993 illustrates a power outlet construction comprising a socket formation having rearwardly extending contacts in the form of flat terminals, one of which is integral with the socket formation of the cigar lighter, having been stamped out therefrom. The resulting end portion of the one terminal is folded back upon itself, to form a contact terminal comprising a double thickness of metal, for improved strength.

While the devices disclosed in the patents noted above have in some circumstances met with commercial success, there is a continuous need to reduce overall manufacturing costs, including steps toward either minimizing or eliminating manual labor. In many of the patented structures, this objective of cost has not been adequately addressed.

Currently there exists a pronounced trend toward use of plastics in the automotive field, especially in the passenger compartment; accordingly, special attention must be given to potential sources of heat and/or fire. In some of the patented cigar lighter constructions employing a bimetal shunt, the bimetal was exposed at the rear of the socket. When overheating occurred, resulting in actuation of the bimetal shunt, arcing at the point of contact between the bimetal and its surrounding grounded conductor was considered somewhat of an electrical hazard.

Also, most prior lighter designs utilized specially configured connectors for energizing the cigar lighter through the socket. Until recently, relatively little attention was given toward standardization of the socket structures and their terminals, and as a consequence, a multiplicity of divergent socket designs have been devised and utilized over the years.

SUMMARY OF THE INVENTION

The above disadvantages and drawbacks of prior cigar lighters are largely obviated by the present invention which has for one object to provide a novel and improved cigar lighter comprising a socket shell and a unique molded plastic combination assembler and connector plug, the lighter being especially adapted for use with conventional electrical connector receptacles of the type utilized in the automotive field, and having a novel safety bimetal shunt arrangement to minimize potential fire hazards from inadvertent overheating of the lighter.

Still another object of the invention is to provide an improved cigar lighter as outlined above, which particularly lends itself to cost-effective manufacture by means of automated assembly equipment, thereby reducing the overall production expense by the greatest possible extent.

Yet another object of the invention is to provide an improved cigar lighter receptacle of the kind indicated, wherein the safety bimetal shunt is especially safe in use, being mostly concealed in the connector receptacle, such that any arcing which may occur during operation of the shunt is safely confined; in addition, in a preferred embodiment the shunt, although mostly confined, can be easily viewed for inspection purposes, from either of two opposite sides of the cigar lighter receptacle, thus facilitating troubleshooting in the event of inadvertent malfunction. The viewing capability does not sacrifice the safety feature provided by the confinement of the bimetal shunt, however.

Still another object of the invention is to provide an improved cigar lighter as above characterized, which utilizes simple push-pull electrical terminal connections that are directly compatible with existing cooperable connectors of a type which have become standard in the automotive industry.

Yet another object of the invention is to provide an improved cigar lighter as above set forth, which is easily installed, and which is characterized by high contact integrity. thereby largely eliminating potential problems of inadvertent contact heating resulting from poor electrical connections arising between the various parts.

Still another object of the invention is to provide an improved cigar lighter socket which provides essentially two separate or independent electrical circuits, one for the ignitor plug which is adapted to be received in the cigar lighter socket member, and a second for an electrically energized load or light source that is used to illuminate a glow ring located at the bezel of the socket member, and/or illuminate the interior of the socket member, thereby facilitating use of the cigar lighter under marginal lighting conditions.

In accomplishing the above objects the invention provides unique combined assembler and connector plug for a cigar lighter of the type having a socket member, comprising in combination a hollow molded plastic plug body having a recess adapted to receive a standard female electrical connector receptacle which has at least one slit portion in which a metal contact part is disposed, the plug body having walls defining the recess, and having a contact prong member disposed in the recess for reception in the slit portion of the standard receptacle. The prong member has a base portion which is molded in the plug body and which has an accessible opening adapted to receive the shank of a push-type fastener stud carried by a cigar lighter socket member, thereby to secure the plug body to the member. The stud additionally provides an electrical connection to the prong member, to enable energization of a cigar lighter ignitor plug carried in the socket member.

The invention further provides, in an electric cigar lighter for vehicles, the combination of a metal receptacle shell, bimetallic clip means in the shell to engage a lighter plug inserted therein, a fastener stud carrying the clip means and having a shank projecting from the rear of the shell, and a combined molded plastic assembler and connector plug having a recess for receiving a standard female electrical connector which has at least one slit portion to accept a contact prong member disposed in the recess of the plug. The prong member is molded in the plug and has an opening that receives with a one-way press fit the shank of the fastener stud to secure the plug to the receptacle shell.

The invention still further provides a combined assembler and connector plug for securement to a cigar lighter receptacle shell, comprising in combination, a molded plastic plug having a recess for receiving a standard female electrical connector which has at least one opening to receive a contact prong member carried in the recess of the plug, the prong member having a molded-in base portion and the plug having a relief in its surface, in which a bimetal shunt is disposed and electrically connected with the contact prong member. When the bimetal shunt experiences heat, it shifts toward the cigar lighter shell to contact the same for actuating a protective, circuit-opening fuse.

The invention also provides an electric cigar lighter having in combination, a receptacle shell, bimetallic clip means in the shell, a fastener stud carrying the clip means and having a shank projecting from the shell, and a combined molded plastic assembler and connector plug attached to the rear of the shell and having molded-in contact prong members, wherein one of the prong members is electrically connected to the stud. A spring washer at the rear of the shell is sandwiched between the rear shell wall and the plug. The other one of the contact prong members has a base that is exposed at the surface of the plug and is resiliently engaged by the spring washer so as to effect an electrical connection to the shell through the washer.

The invention still further provides a unique electric cigar lighter socket construction comprising a metal shell for receiving an ignitor plug, a glow ring assemblage on the metal shell, the assemblage including a translucent ring and a light for illuminating the ring, a molded plastic plug body on the rear of the shell, a contact prong in the plug for connection with a standard electrical connector, said prong having a base portion imbedded in the plug body, and an external electrical contact on the plug, connected with the prong. A cooperable contact on the glow ring assemblage is connected to the light. One of the contacts is annular and engages the other contact regardless of the angular disposition of the glow ring assemblage.

The invention also provides a novel combination electric cigar lighter socket construction comprising a metal shell, a molded plastic plug on the shell, the plug having a plurality of electrical terminals cooperable with a standard connector plug, one of the terminals being electrically connected to the shell and the latter having an insulated electrical contact to which a second one of the terminals is electrically connected. An external annular contact on the plastic plug is connected to a third one of the electrical terminals, and is adapted for connection to a suitable load which is also connected to the external annular contact by means of the the annular contact regardless of the angular disposition of the load.

With the disclosed constructions, there is realized a cigar lighter and connector therefor characterized by a greatly simplified, automated assembly capability of the various components. In spite of the ease of assembly, there is still retained the reliability and functionality of the combined cigar lighter socket member and the assembler and connector plug, the two being essentially unitary in their final configuration, and capable for use directly with an electrical wiring harness connector receptacle of conventional construction and of a type which has become standard in the automotive industry today.

Other features and advantages will hereinafter appear.

BRIEF DESCRIPTION OF THE DRAWINGS

In the drawings, illustrating a preferred embodiment of the invention.

DESCRIPTION OF THE PREFERRED EMBODIMENT

Figure 1:
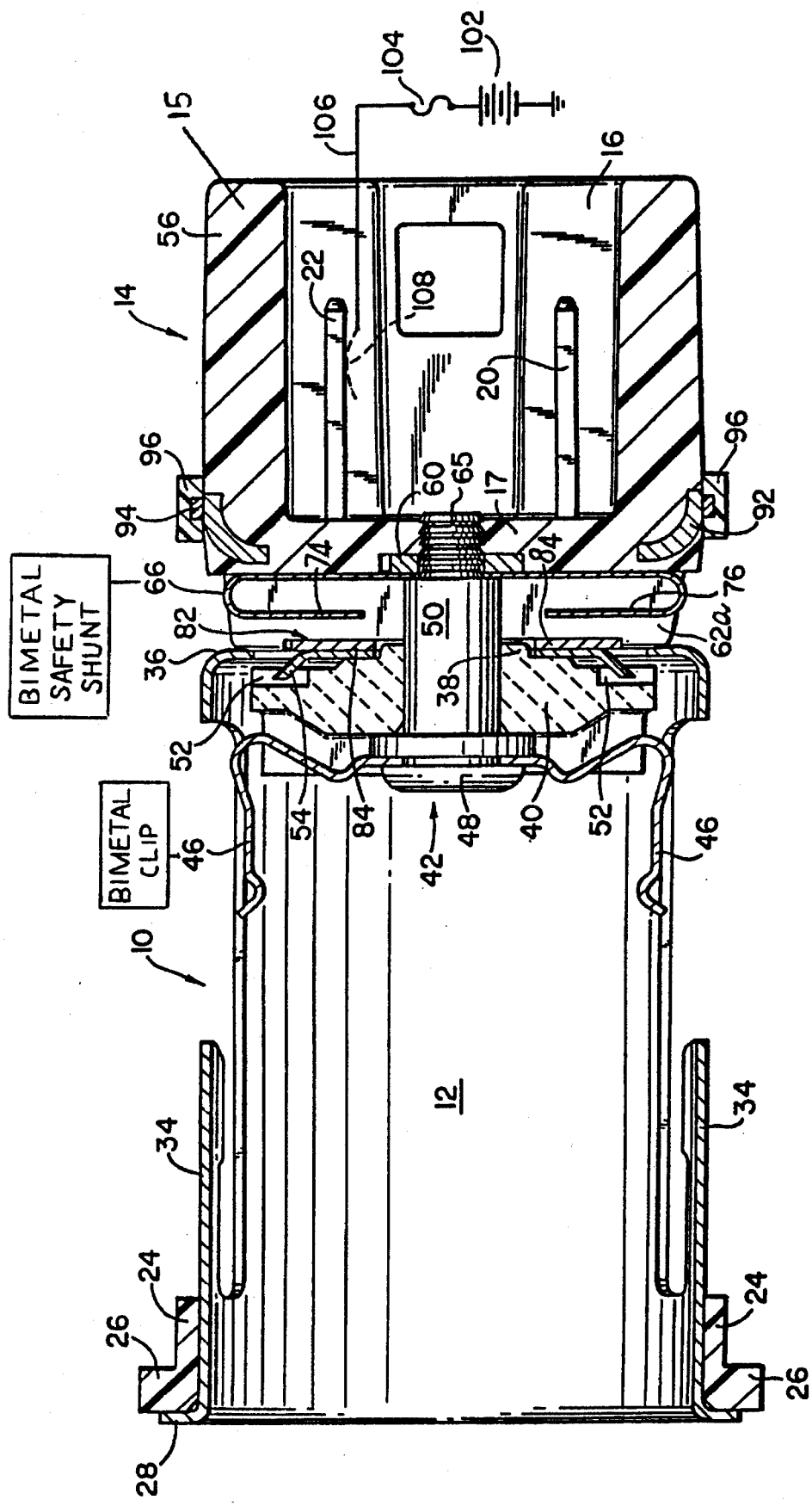
FIG. 1 is an axial sectional view of the improved cigar lighter socket member and assembler and connector plug therefor, as provided by the invention.
Figure 2:
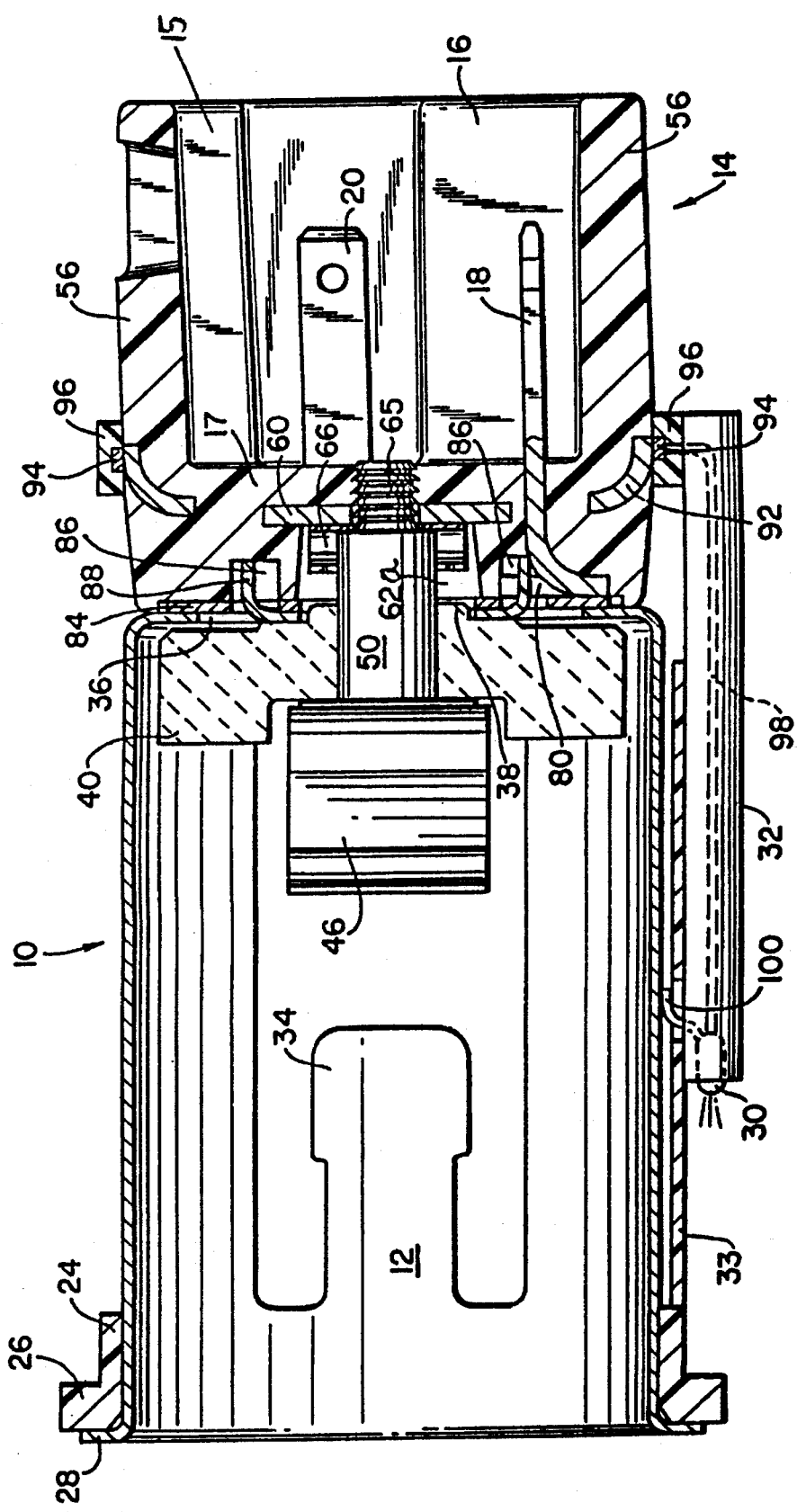
FIG. 2 is an axial sectional view of the construction of FIG. 1, taken in a plane that is displaced 90 degrees from that of the section of FIG. 1.
Figure 3:
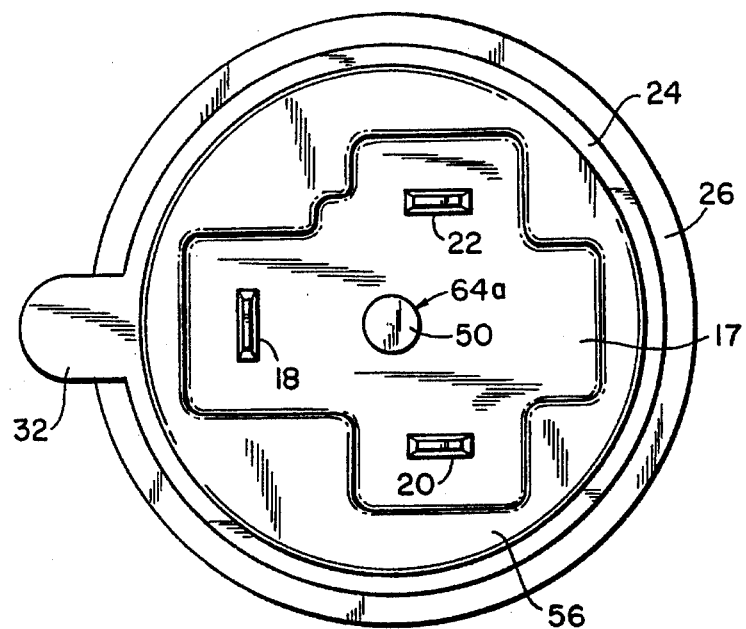
FIG. 3 is a rear elevation of the cigar lighter socket member and assembler and connector plug of FIGS. 1 and 2.
Figure 4:
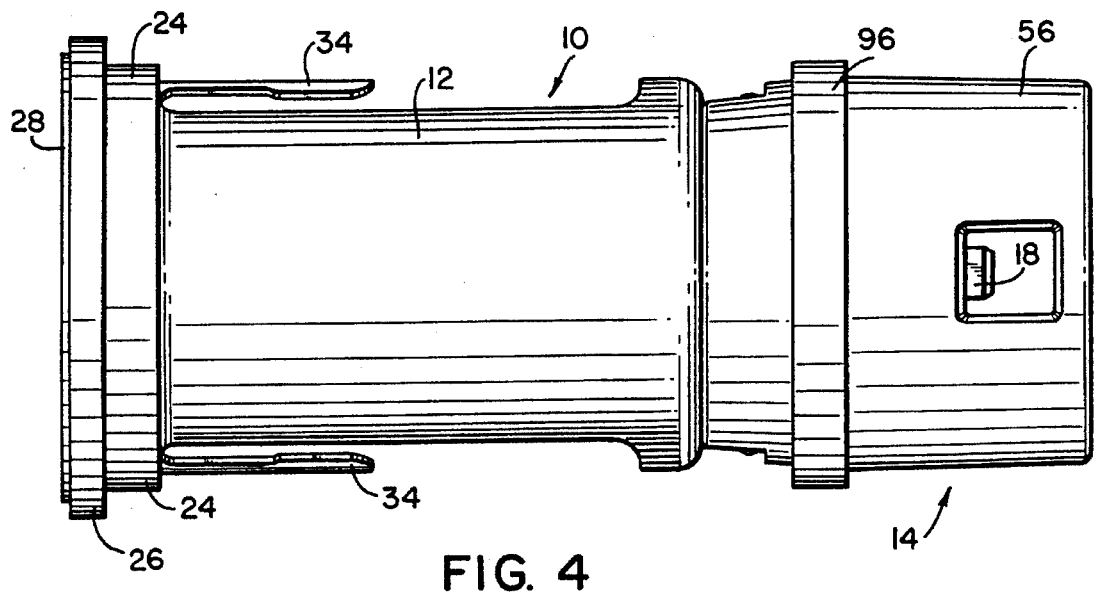
FIG. 4 is a side elevation of the cigar lighter socket member and assembler and connector plug of FIGS. 1 and 2.

Referring first to FIGS. 1–3, there is illustrated a cigar lighter receptacle generally designated by the numeral 10, comprising a socket member 12 in the form of a metal receptacle or socket shell which is adapted to receive an ignitor plug (not shown) of an electric cigar lighter. Such lighters are well known, being of the type conventionally utilized in motor vehicles.

In accordance with the present invention, at the rear of the shell 12 there is provided a novel combined assembler and connector plug assemblage 14 constituted of molded plastic and metallic parts which perform unique multiple functions whereby appreciable cost reductions are realized. Basically the plug assemblage 14 comprises a molded plastic plug body 15, FIG. 2 having a side wall 56 and a transverse bottom wall 17, said body being formed to have a cup-shaped recess 16 in which there are multiple projecting spade-type terminals or lugs 18, 20 and 22 all to be described in further detail below.

Referring first to the shell 12, this is telescopically received in a transparent or translucent glow ring 24, FIG. 1, after which these parts are intended to be pressed into a mounting hole of a supporting panel (not shown) such as a motor vehicle dashboard, and permanently retained therein in a known manner per se. The glow ring 24 has a front flange 26 which abuts a corresponding front flange 28 of the shell 12, as shown. An electrically energized light source or bulb 30 is provided on the glow ring 24 to illuminate the latter from the rear thereof, and/or to illuminate the interior of the shell 12. The bulb 30 is carried in a semi-cylindrical housing 32 that is attached to the glow ring 24 by means of a thin web-like support arm 33.

As is usual, the shell 12 has oppositely-disposed lanced spring fingers 34 which frictionally engage a cigar lighter ignitor plug (not shown) of a type similar to that of U.S. Pat. No. 3,870,857 above identified, to normally frictionally retain the ignitor plug in a shallow storage position in the shell.

The entire disclosure of U.S. Pat. No. 3,870,857 and the entire disclosure of U.S. Pat. No. 3,532,849 are specifically incorporated in the present application, by reference.

Referring again to FIGS. 1 and 2, the inner end of the shell 12 has a transverse rear wall 36 with a central opening which receives a tubular boss or projection 38 of a ceramic insulating block 40 that is to be attached to the shell 12 in a novel press-fit manner. In this connection the block 40 is clamped in position by a unique push or press-fit fastener stud 42 which is particularly illustrated in FIG. 5. The stud 42 also mounts in the usual manner a known type of bimetallic clip means 46 that is insulated from the shell 12 while being electrically connected to the stud 42, at the front of the block 40. The bimetallic clip means 46 comprises a pair of opposite fingers and a central hole to receive the stud 42, the outer end or tip 48 of the latter being headed over the clip means so as to form a secure mechanical connection as well as a permanent electrical connection thereto.

The fastener stud 42 has a shank 50 which extends through the ceramic block 40 and projects through the transverse bottom wall 36 of the shell 12, as shown. The ceramic block 40 is shown as having keying recesses 52, FIG. 1, in its rear surface, and the transverse rear wall 36 of the shell 12 has two teeth 54 struck therefrom, as in the figure, such teeth being received in the keying recesses 52 of the block and preventing relative turning movement between the block and shell.

In accordance with the present invention the unique assemblage comprising the assembler and connector plug 14 that is carried by the shell 12 at the rear thereof, is constituted as a hollow, cup-shaped and generally cylindrical molded plastic plug body having the walls 17 and 56, such body having molded in it the contact prong members 18, 20 and 22 to provide unique characteristics whereby the prong members not only constitute the spade terminal formations shown and are adaptable for use with a standard electrical connector receptacle of a vehicle wiring harness, but also constitute a sturdy mechanical retention means between the plug body 17, 56 and shell 12. The assemblage 14 further includes provision for a safety bimetal shunt which is to be carried inside the plug 14. The said novel assemblage also features the provision of an exteriorly-accessible electrical contact for selective energization, through one of the contact prong members, of an electrically energized source of light for the glow ring 24, and/or the interior of the shell 12.

In carrying out the invention, the plug body 17, 56 is preferably molded in the cup shape shown, forming the recess 16 with the wall portion 17 defining the bottom of the recess. In the disclosed embodiment, the three contact prong members 18, 20 and 22 are illustrated as being molded in place, so as to be permanently embedded in the plug body 17, 56.

Figure 7:
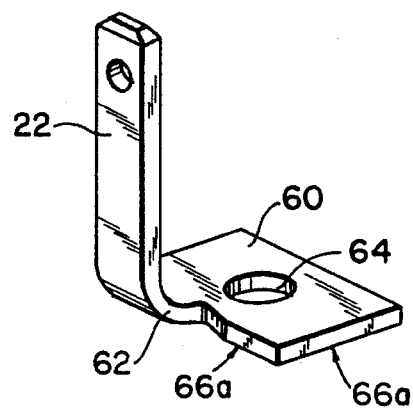
FIG. 7 is a perspective view of another terminal prong utilized in the cigar lighter of FIGS. 1–4.

Referring now to FIG. 7, as provided by the invention the contact prong member 22 has an integrally formed base portion 60 and an offset connector portion 62 which latter is disposed at the edge of the portion 60. The base portion 60 also has, for securement of the assemblage 14 to the shell 12, an opening 64 to receive with a press fit the shank 50 of the stud 42, as will be explained below. Underneath the base portion 60 are important contact surface areas 66a that surround the opening 64. The contact prong member 22 is molded in the plug body 17, 56 in such a position that its base portion 60 and the contact surface areas 66a thereof are exposed exteriorly of the plug body 56, thereby to be accessible to the fastener stud 42 for mechanical retention thereby and electrical contact therewith, as in FIG. 1.

In providing access for the connection between the fastener stud 42 and the base portion 60 of the prong member 22, the plug body 17, 56 is molded with a transverse groove or relief 62a, FIGS. 1 and 2, and the base portion 60 of the prong member is exposed at the bottom of the access groove 62A. A central hole 64a, FIG. 3, in the wall portion 17 of the plug body 56 receives the rightmost end of the fastener stud 42 as viewed in FIG. 1.

Figure 5:
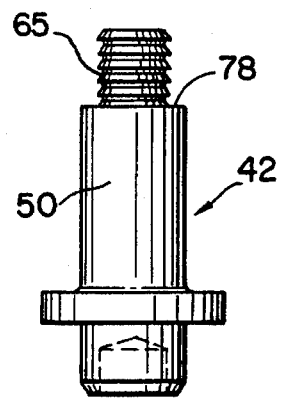
FIG. 5 is a side elevation of the fastener stud utilized in the cigar lighter socket member and assembler and connector plug of FIGS. 1–4.

Further, in accordance with the invention the said rightmost end of the fastener stud 42 is provided with a series of generally circular barbs 65, FIGS. 1, 2 and 5, which become forcibly engaged in the opening 64 of the base portion 60 of the contact prong member in the manner of a "push-on" fastener when the shank 50 of the stud 42 is forced against the opening 64 of the prong base. The barbs 65 forcibly engage and bite into the walls of the opening 64 in one or more annular zones, depending on the spacing between the barbs 65. In a preferred embodiment, the prong member 22 is stamped of cold-rolled steel, plated, and the thickness of the base portion 60 of the prong member is on the order of ¹⁄₃₂", which is considered sufficient for effecting a strong mechanical retention between the stud and base portion.

Figure 9:
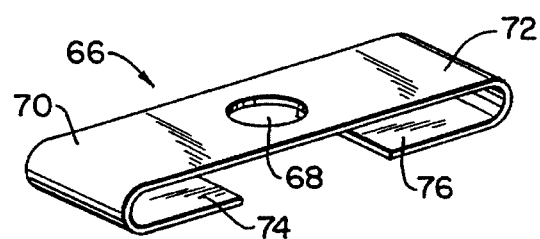
FIG. 9 is a perspective view of a bimetallic shunt utilized in the cigar lighter of FIGS. 1–4.

Also by the invention there is provided a bimetal safety shunt 66 in the access groove 62a, such shunt being particularly illustrated in FIG. 9. The shunt 66 has a central mounting hole 68, and has two oppositely extending legs 70, 72, each leg having a generally U-shaped or channel-like cross sectional configuration, with the openings of the channels facing one another. Each of the legs 70, 72 has a free end, constituting contactor portions 74, 76 respectively.

Referring again to FIGS. 1 and 2, the bimetal shunt 66 is mounted against a shoulder 78, FIG. 5, of the shank 50 of the fastener stud 42, and is sandwiched or pressed between said shoulder and the contact surface areas 66a of the base portion 60 of the contact prong member 22. Pressure is maintained on the surface areas 66a by the bimetal shunt 66 as a consequence of the forcible insertion of the barbs 65 of the fastener stud 42 into the opening 64 in the base portion 60 of the contact prong member 22. The securement of the bimetal shunt 66 occurs simultaneously with the assembly of the plug body 17, 56 to the shell 12, as will be outlined below.

The fastener stud 42 is preferably constituted of tempered brass, and for such metal of the stud, the contact prong member 22 is chosen as steel, plated. During the insertion of the stud 42 into the opening 64, FIG. 7, the barbs 65 deform somewhat, and permanently retain the base portion 60 of the contact prong member 22 (and the surrounding plug body assemblage 14) as a consequence of the press-on operation.

Figure 8:
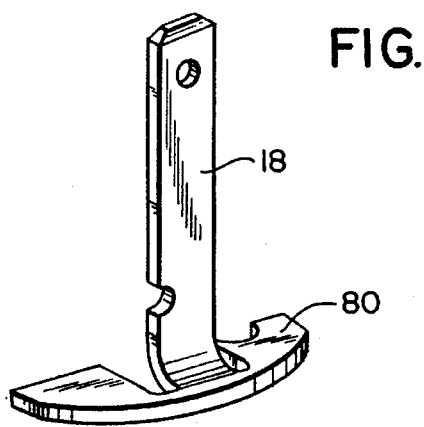
FIG. 8 is a perspective view of still another terminal prong utilized in the cigar lighter of FIGS. 1–4.

The second contact prong member 18 is particularly illustrated in FIG. 8, comprising a spade terminal portion and a base 80. This contact prong member 18 is utilized in establishing the electric "ground" leg of the cigar lighter circuit, which has the same electrical potential as that of the shell 12. The contact prong member 18 is according to the invention also molded or embedded in the plug body 17, 56, and located such that its base 80 is exposed exteriorly of the plug body, FIG. 2. In accomplishing the electrical connection of this contact prong member 18 to the shell 12, there is provided at the inner end of the plug body 56, a generally flat depression 82, FIG. 1. Disposed in the depression 82 is a resilient, bowed spring washer 84, particularly illustrated in FIGS. 10 and 11. During the attachment of the plug assemblage 14 to the shell 12, the washer 84 becomes flattened, and the resulting pressure exerted by the flattened washer 84 maintains a firm engagement between the transverse wall 36 of the shell 12 and the base 80 of the contact prong member 18, as shown in FIG. 2. In FIG. 8, the base 80 is shown as a generally crescent-shaped sector. The base 80 is integrally formed with the spade terminal portion of the member 18, as is understood. In use, the base 80 is resiliently engaged by the spring washer 84 so as to maintain electrical continuity between the contact prong member 18 and the shell 12. Preferably the entire spring washer 84 is copper plated, so as to minimize any metal fusing and thereby facilitate automatic re-setting of the shunt following an overheat condition, as can now be understood.

Figure 10:
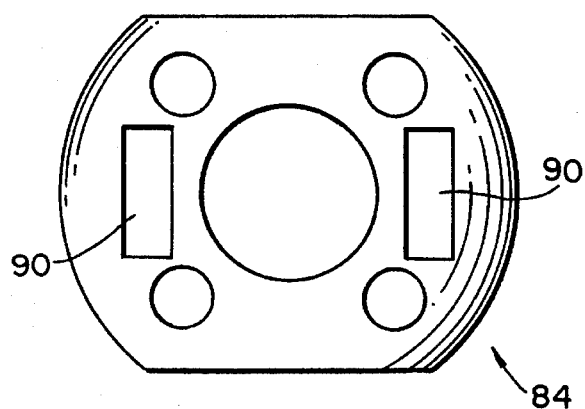
FIG. 10 is a top plan view of a resilient, bowed spring washer utilized in the cigar lighter of FIGS. 1–4.
Figure 11:
FIG. 11 is a side elevation of the washer of FIG. 10.

As seen in FIG. 2, the front end of the plug body 17, 56 is provided with oppositely disposed keying recesses 86, which receive cooperable lugs 88 struck from the transverse wall 36 of the shell 12. In addition, preferably one of the lugs 88 engages the contact prong member 18, also as seen in FIG. 2. In FIG. 10 there are illustrated two rectangular keying holes 90 in the bowed spring washer 84, which also receive the lugs 88 struck from the transverse wall 36 of the shell 12.

Figure 6:
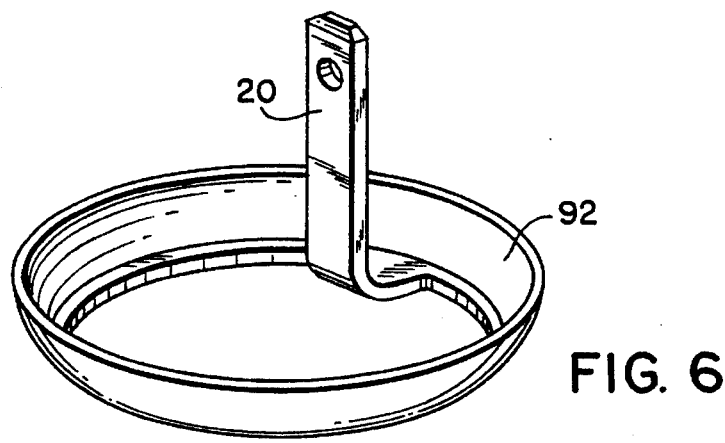
FIG. 6 is a perspective view of a combined electric terminal prong and electrical contact utilized in the improved cigar lighter of FIGS. 1–4.

The third contact prong member 20 is particularly illustrated in FIG. 6, and is employed to establish a third electric "leg" of the cigar lighter circuit, namely that associated with an electrical load such as the electrically energized source of light represented by the lamp 30 in FIG. 2. The contact prong member 20 comprises a spade terminal portion, and a contact ring 92. The member 20 is molded or embedded in the plug body 17, 56, and located so that the ring 92 thereof is exposed at the outer cylindrical surface of the body walls 17, 56, as in FIGS. 1 and 2. The ring 92 is electrically insulated from both of the other contact prong members 18 and 22, and is intended to be engaged by a cooperable external contact 94, for example, in a ring or band 96 that is physically connected to the lamp housing 32. The band 96 can take the form of an insulating plastic ring having an internal annular groove. The contact strip 94 is carried in the internal groove of the band 96 as in FIG. 2, and is electrically connected to one side of the lamp 30 by means of a conductor 98 in the lamp housing 32, shown in dotted outline in this figure. The other electrical connection to the lamp 30 is effected by a spring finger 100 that extends from the lamp housing 32, through a hole in the support arm 33, and bears with frictional engagement against the exterior surface of the shell 12, which is at electrical ground potential.

The arrangement is such that an electrical connection is effected between the strip 94 of the contact prong member 20 and the lamp 30 for any of a multiplicity of angular orientations of the lamp 30 and band 96 with respect to the plug body 56. In the disclosed embodiment, the contact strip 94 is shown as being annular. In practice, with the ring or annular contact 92 constructed as shown, the conductive strip 94 can take the form of either a point contact (not shown), or alternately a segmented contact (not shown) extending through a small angle. As presently understood, the strip 94 occupying the internal groove of the band 96 preferably would be provided with a spring characteristic, similar to a wave washer, to thereby cause a resilient pressure therefrom on the ring 92.

FIG. 1 illustrates diagrammatically the vehicle's storage battery 102 and a protective, circuit-opening fuse 104, connected via an electrical lead 106, to a contact prong 108 in the power supply receptacle (not shown) which is insertable in the plug assemblage 14 for engagement with the prong 22.

In assembly of the improved combined assembler and connector plug assemblage and shell of the invention, the stud 42 having the captive bimetallic clip means 46 is first inserted in the ceramic block 40, and the resultant subassembly thereafter inserted into the shell 12 such that the shank 50 projects from the rear of the transverse wall 36 thereof. Then the spring washer 84 is placed on the back side of the wall 36 with its hole aligned with the boss 38 of the ceramic block. Following this operation the bimetal shunt 66 is placed on the shank 50 in engagement with the shoulder 78 thereof, and the molded plug assemblage 14 comprising walls 17, 56, and spade-type terminals 18, 20 and 22, installed on the stud shank, such that the base portion 60 is forcibly fitted onto the barbs 65 of the stud shank, causing a moderate deformation of the barbs and resulting in a permanent retention of the assemblage 14 on the rear of the shell 12. During the assembly the bowed spring washer 84 flattens somewhat, causing it to resiliently engage both the conductive surface of the rear wall 36 and the base 80 (FIGS. 2 and 8) of the contact prong member 18. At the same time, a firm mechanical retention is established between the stud 42 and base portion 60 (and plug assemblage in which it is molded). Also, the bimetal shunt 66 is firmly mechanically secured between the shoulder 78 of the stud shank, and the base portion 60, FIGS. 2 and 7. By such an arrangement, the bimetal shunt 66 is held, simultaneously with the securement of the base 80, spring washer 84 and wall 36 of the socket member or shell 12. The flattening of the washer 84 absorbs any looseness or play which might otherwise occur between the wall 36 and base 80, to assure good electrical contact of these parts.

In operation, in the event of an overheat condition in the shell 12, the bimetal shunt 66, being constituted of two layers of metals of dissimilar coefficient of thermal expansion, undergoes flexing; in particular, the contactor portions 74, 76, FIG. 9, flex toward the left in FIG. 1, eventually electrically contacting the spring washer 84, and short-circuiting the contact prong terminal base portion 60, through the washer 84 to the shell 12, which latter is electrically at ground potential. The fuse 104 thus blows, and the cigar lighter circuit is protected against further heating or energization.

Upon cooling of the bimetal shunt 66, it will tend to spring back to the position of FIG. 1 if it has not become welded to the washer. Thereafter, re-energization of the circuit through a replacement fuse 104, will enable further cigar lighter operation to occur. If, however, the bimetal shunt 66 has become "welded" to the washer 84, then upon such re-energization, the weld will be heated momentarily and broken, so as to release the shunt 66 and enable it to spring to its normal position. Thus, any tendency for fusing of the contactor portions 74, 76 to the washer 84 can be minimized by having the spring washer 84 copper plated. The dissimilar metals, copper plate on the spring washer 84, with the alloy metal of the shunt 66, tend to resist formation of a permanent weld between the shunt and the washer, which might otherwise render the lighter unuseable following an initial actuation of the bimetal shunt 66 as a result of an overheat condition having been experienced.

From the above it can be seen that I have provided a novel and improved combined assembler and connector plug for a cigar lighter socket, the device being especially adapted for use with standard automotive-type electrical connector receptacles of a class commonly in use today with vehicle wiring harnesses. These receptacles include, specifically, those manufactured by Packard Electric, AMP, and others, known as, "2.8 mm. female 12-volt electrical plugs." The "2.8 mm." figure refers to the width of the "spade" part of the contact prong members 18, 20, 22, with which such electrical plugs are to mate.

The device is especially compact, and capable of greatly reduced production cost made possible by the use of automated assembly equipment. An important safety feature is included, to protect against inadvertent overheating of any of the parts, and rendered automatically operative to open the circuit by means of an in-line protective fuse in response to such overheating.

The disclosed device is thus seen to represent a distinct advance and improvement in the automotive cigar lighter field.

Variations and modifications are possible without departing from the spirit of the invention.

Each and every one of the appended claims defines an aspect of the invention which is separate and distinct from all others, and accordingly it is intended that each claim be treated as such when examined in the light of the prior art devices in any determination of novelty or validity.

What is claimed is:

1. In a cigar lighter of the type having an electrically conductive socket shell, and a fastener stud having a shank, said fastener stud being carried by and electrically insulated from said shell, a combined assembler and connector plug comprising, in combination:

a) a hollow molded plastic, electrically insulating plug body having a substantially cup-shaped recess adapted to receive a female electrical connector receptacle of the type provided with at least one slit in which a metal contact part is disposed, b) said plug body having a peripheral side wall portion defining a peripheral side wall of said cup-shaped recess, said plug body having a transverse bottom wall, c) a projecting contact prong member disposed in the cup-shaped recess of the plug body, and extending away from the transverse bottom wall thereof, said projecting contact prong member being spaced from the peripheral side wall of the recess, said contact prong member being adapted to be received in the slit of said receptacle when the receptacle is inserted into said cup-shaped recess, d) said prong member having an integrally-formed base portion which is molded into and held captive in the transverse bottom wall of the plug body, and which base portion has an accessible opening which receives and is mechanically secured to and electrically connected with the shank of the fastener stud carried by the cigar lighter socket shell, to mechanically secure the plug body to said socket shell, said prong member being electrically insulated from the electrically conductive socket shell of the cigar lighter.

2. A combined assembler and connector plug as set forth in claim 1, wherein the thickness of the base portion of the prong member is on the order of 1/32".

3. A combined assembler and connector plug as set forth in claim 1, wherein the opening of the base portion of the prong member is disposed at the center of the transverse bottom wall of the plug body.

4. A combined assembler and connector plug as set forth in claim 1, wherein said contact prong member has a prong portion which is disposed at an edge of its base portion.

5. A combined assembler and connector plug as set forth in claim 1, wherein said transverse bottom wall of the plug body has a groove, and wherein the opening of the base portion of the prong member is disposed at the bottom of said groove.

6. A combined assembler and connector plug as set forth in claim 5, wherein said base portion of the prong member has surface contact areas, and wherein said surface contact areas surround the opening of the base portion and are exposed at the bottom of the groove of the plug body.

7. A combined assembler and connector plug as set forth in claim 1, wherein the contact prong member extends through the transverse bottom wall of the plug body.

8. A combined assembler and connector plug as set forth in claim 1, wherein:
 a) the transverse bottom wall of the plug body has a recess which is aligned and communicates with the opening in the base portion of the contact prong member.

9. An electric cigar lighter for vehicles comprising, in combination:
 a) an electrically conductive metal receptacle shell adapted to receive a lighter plug,
 b) bimetallic clip means insulatedly carried in said shell and adapted to engage and energize a lighter plug inserted therein,
 c) a fastener stud which carries said clip means, said stud having a shank projecting from the rear of the receptacle shell,
 d) a combined assembler and connector plug comprising a hollow molded plastic, electrically insulating plug body having a substantially cup-shaped recess adapted to receive a female electrical connector receptacle of the type provided with at least one slit in which a metal contact part is disposed, said plug body having a peripheral side wall portion defining a peripheral side wall of said cup-shaped recess, said plug body having a transverse bottom wall, and said assembler and connector plug further comprising a projecting contact prong member disposed in the cup-shaped recess of the plug body, and extending away from the transverse bottom wall thereof, said projecting contact prong member being spaced from the peripheral side wall of the recess, said contact prong member being adapted to be received in the slit of said connector receptacle when the connector receptacle is inserted into said cup-shaped recess, said prong member having an integrally-formed base portion which is molded in the plug body, and which base portion has an opening which receives and is mechanically secured to and electrically connected with the shank of said fastener stud to mechanically secure the plug body to said receptacle shell, said prong member being electrically insulated from said electrically conductive metal receptacle shell of the cigar lighter.

10. An electric cigar lighter as set forth in claim 9, and further including a resilient, bowed spring washer disposed between the transverse bottom wall of the plug body and the shell, to eliminate looseness therebetween.

11. An electric cigar lighter as set forth in claim 9, wherein the shank of said stud has a shoulder adapted for engagement with the base portion of the contact prong member.

12. An electric cigar lighter as set forth in claim 9, wherein the shank of said stud passes into the transverse bottom wall of the plug body.

13. In a cigar lighter of the type having a socket shell, a combined assembler and connector plug for securement to the cigar lighter socket shell, said assembler and connector plug comprising, in combination:
 a) a hollow molded plastic plug body having a recess adapted to receive a female electrical connector receptacle of the type provided with at least one opening in which a metal contact part is disposed,
 b) said plug body having a wall portion defining a wall of said recess,
 c) a contact prong member disposed in the recess of the plug body and adapted to be received in the opening of said receptacle,
 d) said prong member having a base portion carried by the plug body,
 e) said plug body having a relief, and
 f) a bimetal shunt means disposed in said relief and electrically connected with said contact prong member, said relief facing the cigar lighter shell when the plug body is attached thereto,
 g) said bimetal shunt means having a contactor portion which, when the bimetal shunt means experiences heat, shifts toward said socket shell so as to come into electrical contact therewith for the purpose of electrically short-circuiting the prong member to the socket shell, and thereby blowing a protective, circuit-opening fuse.

14. A combined assembler and connector plug as set forth in claim 13, wherein said plug body has a depression at its end which is adjacent the cigar lighter shell, and
 a) a resilient, bowed spring washer received in said depression, said bowed spring washer being flattened when the plug body is assembled to the shell, and being maintained in electrical and mechanical contact therewith.

15. An electric cigar lighter for vehicles comprising, in combination:
 a) a metal receptacle shell adapted to receive a lighter plug,
 b) bimetallic clip means insulatedly carried in said shell and adapted to engage and energize a lighter plug inserted therein,
 c) a fastener stud which carries said clip means, said stud having a shank projecting from the rear of the receptacle shell,
 d) a combined assembler and connector plug attached to the rear of the shell, said plug comprising a molded plastic plug body having a pair of contact prong members carried by said plug body, one of said prong members being electrically connected to said fastener stud,
 e) the other of said contact prong members having a base that is exposed at the surface of the plug body, and
 f) spring washer means carried at the rear of the receptacle shell and sandwiched between the shell and the plug body, one side of said spring washer means resiliently engaging the exposed base of said other contact prong member at said plug body surface, and the other side of said spring washer means resiliently engaging the shell, so as to establish electrical connection between the base of said contact prong member and said shell.

16. An electric cigar lighter receptacle shell as set forth in claim 15, wherein the plug body has a relief, and wherein said spring washer is disposed in said relief when the plug body and shell are assembled.

17. An electric cigar lighter socket comprising, in combination:
 a) a metal receptacle shell adapted to receive a cigar lighter ignitor plug,
 b) a glow ring assemblage carried on said receptacle shell, said assemblage including a translucent ring and a source of light for illuminating said ring,
 c) a molded plastic plug body carried at the rear of the shell, d) a contact prong member carried by said plastic plug body, for connection with an electrical connector receptacle, e) said prong member having a base portion which is embedded in the plug body, f) means providing an external electrical contact on said plug body, electrically connected with said prong member, g) means providing a cooperable electrical contact on said glow ring assemblage, said cooperable electrical contact being connected to energize said source of light, h) one of said electrical contacts being annular, so as to electrically engage the other electrical contact regardless of the angular disposition of the glow ring assemblage with respect to the plug body.

18. An electric cigar lighter socket as set forth in claim 17, wherein said external electrical contact on the plug body is annular.

19. An electric cigar lighter socket as set forth in claim 17, wherein said prong member and said electrical contact providing means on the plug body are integral with one another.

20. An electric cigar lighter socket as set forth in claim 17, wherein said glow ring assemblage comprises an insulating ring encircling the plug body, said insulating ring having an internal groove and said cooperable electrical contact comprising an electrically conductive strip disposed in said groove, and adapted for sliding engagement with said external electrical contact.

21. An electric socket for use in vehicles, comprising in combination:

a) a metal receptacle shell, b) a molded plastic plug body carried at the rear of the shell, said plug body having a plurality of electrical terminals for connection to a cooperable connector receptacle plug, c) one of said terminals being electrically connected to said shell, d) said shell containing an insulated electrical contact, and a second one of said terminals being electrically connected to said insulated electrical contact, e) an external annular contact on said plastic plug body, said annular contact being connected to a third one of said electrical terminals, said external annular contact being adapted for connection to a load, f) means providing an electrical connection between said external annular contact and the load, which connection-providing means engages the annular contact regardless of the angular disposition of the load with respect to the plug body.

22. An electric socket as set forth in claim 21, wherein said load comprises an electrically energizeable source of light.

23. In a cigar lighter of the type having an electrically conductive socket shell, and a fastener stud having a shank, said fastener stud being carried by and electrically insulated from said shell, a combined assembler and connector plug comprising, in combination:

a) a hollow molded plastic plug body having a recess adapted to receive a female electrical connector receptacle of the type provided with at least one slit in which a metal contact part is disposed, b) said plug body having a wall portion defining a wall of said recess, c) a contact prong member disposed in the recess of the plug body and adapted to be received in the slit of said receptacle, d) said prong member having a base portion which is molded in the plug body and which has an accessible opening adapted to receive the shank of the fastener stud carried by the cigar lighter socket shell, to secure the plug body to said socket shell, e) said wall portion of the plug body having a groove, and the opening of the base portion of the prong member being disposed at the bottom of said groove, f) said groove having side wall portions which overlie the base portion of the contact prong member.

24. An electric cigar lighter for vehicles comprising, in combination:

a) a metal receptacle shell adapted to receive a lighter plug, b) bimetallic clip means insulatedly carried in said shell and adapted to engage and energize a lighter plug inserted therein, c) a fastener stud which carries said clip means, said stud having a shank projecting from the rear of the receptacle shell, d) a combined assembler and connector plug comprising a hollow molded plastic plug body having a recess adapted to receive a female electrical connector receptacle of the type provided with at least one slit in which a metal contact part is disposed, said plug body having a wall portion defining a wall of said recess and said assembler and connector plug further comprising a contact prong member disposed in the recess of the plug body and adapted to be received in the slit of said connector receptacle, said prong member having a base portion which is molded in the plug body and which has an opening which receives the shank of said fastener stud to secure the plug body to said receptacle shell, e) the shank of said stud having barbs engaging the walls of the opening in the base portion of the contact prong member, thereby to securely fasten the body of the assembler and connector plug to the receptacle shell.

25. An electric cigar lighter as set forth in claim 24, wherein said barbs are circular and engage the walls of the opening of the base portion of said contact prong member, in annular zones.

26. An electric cigar lighter for vehicles comprising, in combination:

a) a metal receptacle shell adapted to receive a lighter plug, b) bimetallic clip means insulatedly carried in said shell and adapted to engage and energize a lighter plug inserted therein, c) a fastener stud which carries said clip means, said stud having a shank projecting from the rear of the receptacle shell, d) a combined assembler and connector plug comprising a hollow molded plastic plug body having a recess adapted to receive a female electrical connector receptacle of the type provided with at least one slit in which a metal contact part is disposed, said plug body having a wall portion defining a wall of said recess and said assembler and connector plug further comprising a contact prong member disposed in the recess of the plug body and adapted to be received in the slit of said connector receptacle, said prong member having a base portion which is molded in the plug body and which has an opening which receives the shank of said fastener stud to secure the plug body to said receptacle shell, e) said receptacle shell having a projecting tab, and the wall portion of said plug body having a keying recess into which said projecting tab extends.

27. An electric cigar lighter as set forth in claim 26, and further including a resilient bowed spring washer disposed between the wall portion of the plug body and the shell to eliminate looseness therebetween, said bowed washer having a keying hole, and said projecting tab of the cigar lighter shell extending through said keying hole in the bowed washer.

28. An electric cigar lighter for vehicles comprising, in combination:
   a) a metal receptacle shell adapted to receive a lighter plug,
   b) bimetallic clip means insulatedly carried in said shell and adapted to engage and energize a lighter plug inserted therein,
   c) a fastener stud which carries said clip means, said stud having a shank projecting from the rear of the receptacle shell,
   d) a combined assembler and connector plug comprising a hollow molded plastic plug body having a recess adapted to receive a female electrical connector receptacle of the type provided with at least one slit in which a metal contact part is disposed, said plug body having a wall portion defining a wall of said recess and said assembler and connector plug further comprising a contact prong member disposed in the recess of the plug body and adapted to be received in the slit of said connector receptacle, said prong member having a base portion which is molded in the plug body and which has an opening which receives the shank of said fastener stud to secure the plug body to said receptacle shell,
   e) said receptacle shell having a projecting tab and said plug body having an additional contact prong member embedded therein, said additional prong member having a supporting portion molded in the wall portion of the plug body, said supporting portion of the additional contact prong member engaging the projecting tab of the receptacle shell.

29. An electric cigar lighter for vehicles comprising, in combination:
   a) a metal receptacle shell adapted to receive a lighter plug,
   b) bimetallic clip means insulatedly carried in said shell and adapted to engage and energize a lighter plug inserted therein,
   c) a fastener stud which carries said clip means, said stud having a shank projecting from the rear of the receptacle shell,
   d) a combined assembler and connector plug comprising a hollow molded plastic plug body having a recess adapted to receive a female electrical connector receptacle of the type provided with at least one slit in which a metal contact part is disposed, said plug body having a wall portion defining a wall of said recess and said assembler and connector plug further comprising a contact prong member disposed in the recess of the plug body and adapted to be received in the slit of said connector receptacle, said prong member having a base portion which is molded in the plug body and which has an opening which receives the shank of said fastener stud to secure the plug body to said receptacle shell,
   e) said receptacle shell having two projecting tabs, said plug body having an additional contact prong member embedded therein, said additional prong member having a supporting portion molded in the wall portion of the plug body, said supporting portion of the additional contact prong member engaging one of said two projecting tabs of the shell.

30. An electric cigar lighter for vehicles comprising, in combination:
   a) a metal receptacle shell adapted to receive a lighter plug,
   b) bimetallic clip means insulatedly carried in said shell and adapted to engage and energize a lighter plug inserted therein,
   c) a fastener stud which carries said clip means, said stud having a shank projecting from the rear of the receptacle shell,
   d) a combined assembler and connector plug comprising a hollow molded plastic plug body having a recess adapted to receive a female electrical connector receptacle of the type provided with at least one slit in which a metal contact part is disposed, said plug body having a wall portion defining a wall of said recess and said assembler and connector plug further comprising a contact prong member disposed in the recess of the plug body and adapted to be received in the slit of said connector receptacle, said prong member having a base portion which is molded in the plug body and which has an opening which receives the shank of said fastener stud to secure the plug body to said receptacle shell,
   e) the shank of said stud having a shoulder adapted for engagement with the base portion of the contact prong member, and
   f) a safety bimetal shunt carried by the shoulder of the said stud and electrically engaging the base portion of the contact prong member.

31. An electric cigar lighter for vehicles comprising, in combination:
   a) a metal receptacle shell adapted to receive a lighter plug,
   b) bimetallic clip means insulatedly carried in said shell and adapted to engage and energize a lighter plug inserted therein,
   c) a fastener stud which carries said clip means, said stud having a shank projecting from the rear of the receptacle shell,
   d) a combined assembler and connector plug comprising a hollow molded plastic plug body having a recess adapted to receive a female electrical connector receptacle of the type provided with at least one slit in which a metal contact part is disposed, said plug body having a wall portion defining a wall of said recess and said assembler and connector plug further comprising a contact prong member disposed in the recess of the plug body and adapted to be received in the slit of said connector receptacle, said prong member having a base portion which is molded in the plug body and which has an opening which receives the shank of said fastener stud to secure the plug body to said receptacle shell, and
   e) cooperable means on said receptacle shell and on said plug body, keying the latter against turning with respect to said receptacle shell.

32. In a cigar lighter of the type having a socket shell, a combined assembler and connector plug for securement to the cigar lighter socket shell, said assembler and connector plug comprising, in combination:
   a) a hollow molded plastic plug body having a recess adapted to receive a female electrical connector receptacle of the type provided with at least one opening in which a metal contact part is disposed, b) said plug body having a wall portion defining a wall of said recess, c) a contact prong member disposed in the recess of the plug body and adapted to be received in the opening of said receptacle, d) said prong member having a base portion carried by the plug body, e) said plug body having a relief, and f) a bimetal shunt disposed in said relief and electrically connected with said contact prong member, said relief facing the cigar lighter shell when the plug body is attached thereto, g) said bimetal shunt having a contactor portion which, when the bimetal shunt experiences heat, shifts toward the said shell so as to come into electrical contact therewith for the purpose of actuating a protective, circuit-opening fuse, h) said relief comprising a groove extending transversely of the receptacle shell, said groove being open at two opposite ends when the plug body is assembled to the shell to enable the bimetal to be viewed from either end of the groove.

33. A combined assembler and connector plug as set forth in claim 32, wherein said plug body is generally cylindrical, and wherein all portions of the bimetal shunt are disposed within the groove, thereby avoiding exposure of the bimetal shunt to objects exterior to the plug body and shell.

34. A combined assembler and connector plug as set forth in claim 32, wherein said base portion of the prong member is exposed in said groove and is electrically connected with said bimetal shunt.

35. In a cigar lighter of the type having a socket shell, a combined assembler and connector plug for securement to the cigar lighter socket shell, said assembler and connector plug comprising, in combination:

a) a hollow molded plastic plug body having a recess adapted to receive a female electrical connector receptacle of the type provided with at least one opening in which a metal contact part is disposed, b) said plug body having a wall portion defining a wall of said recess, c) a contact prong member disposed in the recess of the plug body and adapted to be received in the opening of said receptacle, d) said prong member having a base portion carried by the plug body, e) said plug body having a relief, f) a bimetal shunt disposed in said relief and electrically connected with said contact prong member, said relief facing the cigar lighter shell when the plug body is attached thereto, g) said bimetal shunt having a contactor portion which, when the bimetal shunt experiences heat, shifts toward the said shell so as to come into electrical contact therewith for the purpose of actuating a protective, circuit-opening fuse, h) said plug body having a depression at its end which is adjacent the cigar lighter shell, i) a resilient, bowed spring washer received in said depression, said bowed spring washer being flattened when the plug body is assembled to the shell, and being maintained in electrical and mechanical contact therewith, and j) a second contact prong member disposed in the recess of the plug body, said second contact prong member having a base portion embedded in the plug body, said base portion being exposed in said depression and being engaged by the said spring washer so as to electrically contact the latter.

36. A combined assembler and connector plug as set forth in claim 35, wherein said spring washer is copper plated, said bimetal shunt being constituted of two laminated metals of dissimilar expansion coefficient, and wherein the shunt has a contactor portion which is engageable with the spring washer, the copper on the washer minimizing arc fusion and thereby facilitating re-setting of the bimetal shunt upon initial re-energization of the connector plug, after the shunt has actuated the said fuse.

37. In a cigar lighter of the type having a socket shell, a combined assembler and connector plug for securement to the cigar lighter socket shell, said assembler and connector plug comprising, in combination:

a) a hollow molded plastic plug body having a recess adapted to receive a female electrical connector receptacle of the type provided with at least one opening in which a metal contact part is disposed, b) said plug body having a wall portion defining a wall of said recess, c) a contact prong member disposed in the recess of the plug body and adapted to be received in the opening of said receptacle, d) said prong member having a base portion carried by the plug body, e) said plug body having a relief, and f) a bimetal shunt disposed in said relief and electrically connected with said contact prong member, said relief facing the cigar lighter shell when the plug body is attached thereto, g) said bimetal shunt having a contactor portion which, when the bimetal shunt experiences heat, shifts toward the said shell so as to come into electrical contact therewith for the purpose of actuating a protective, circuit-opening fuse, h) said bimetal shunt having two oppositely-extending legs, each of said legs having a generally U-shaped cross sectional configuration and each leg comprising a free end, the free end of each leg facing that of the other leg and being capable of independent movement upon experiencing heat, such that either leg can effect electrical contact with the socket shell carrying the connector plug for the purpose of actuating the protective fuse.

38. In a cigar lighter of the type having a socket shell, a combined assembler and connector plug for securement to the cigar lighter socket shell, said assembler and connector plug comprising, in combination:

a) a hollow molded plastic plug body having a recess adapted to receive a female electrical connector receptacle of the type provided with at least one opening in which a metal contact part is disposed, b) said plug body having a wall portion defining a wall of said recess, c) a contact prong member disposed in the recess of the plug body and adapted to be received in the opening of said receptacle, d) said prong member having a base portion carried by the plug body, e) said plug body having a relief, f) a bimetal shunt disposed in said relief and electrically connected with said contact prong member, said relief facing the cigar lighter shell when the plug body is attached thereto, g) said bimetal shunt having a contactor portion which, when the bimetal shunt experiences heat, shifts toward the said shell so as to come into electrical contact therewith for the purpose of actuating a protective, circuit-opening fuse, h) a shouldered fastener stud adapted to attach the plug to the socket shell of the cigar lighter, and said bimetal shunt having a mounting hole through which the stud extends, and i) said base portion of the prong member and the shoulder of the stud sandwiching between them said bimetal shunt at the location of said mounting hole, to effect a firm mechanical retention of the shunt and establish electrical connection therewith.

39. An electric cigar lighter for vehicles comprising, in combination:

a) a metal receptacle shell adapted to receive a lighter plug, b) bimetallic clip means insulatedly carried in said shell and adapted to engage and energize a lighter plug inserted therein, c) a fastener stud which carries said clip means, said stud having a shank projecting from the rear of the receptacle shell, d) a combined assembler and connector plug attached to the rear of the shell, said plug comprising a molded plastic plug body having a pair of contact prong members carried by said plug body, one of said prong members being electrically connected to said fastener stud, e) a spring washer carried at the rear of the receptacle shell and sandwiched between the shell and the plug body, f) the other one of said contact prong members having a base that is exposed at the surface of the plug body, said base being resiliently engaged by the spring washer so as to effect an electrical connection to the socket, through the washer, g) said fastener stud having external barbs adapted for mechanical engagement with and electrical connection to said said one prong member.

40. An electric cigar lighter receptacle shell as set forth in claim 39, wherein the engagement of the barbs of said fastened stud and said prong member clinches the plug body in position at the rear of the cigar lighter shell, said engagement also flattening the spring washer and maintaining pressure between said washer and the shell on the one hand, and between the washer and the base of said other contact prong member on the other hand.

* * * * *